April 12, 1927.
E. D. SPOERRI
MEASURING AND REELING DEVICE
Filed July 1, 1926
2 Sheets-Sheet 1
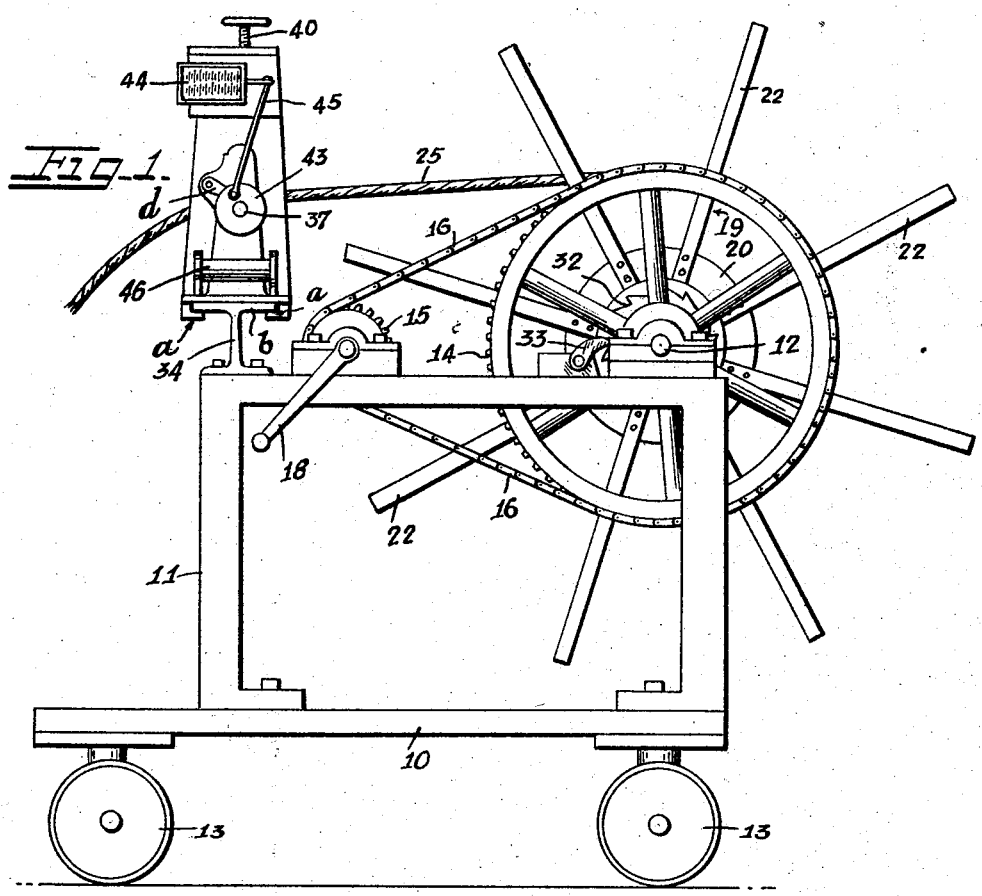
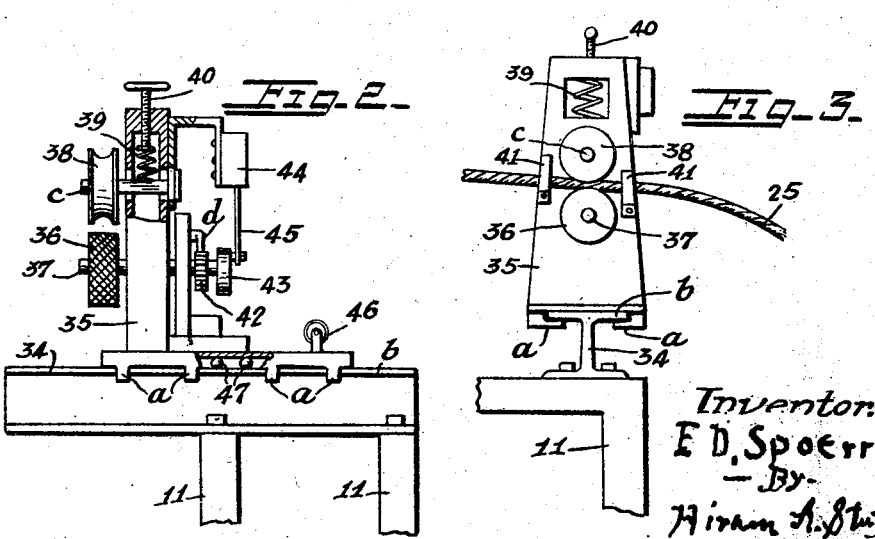
Inventor,
E. D. Spoerri

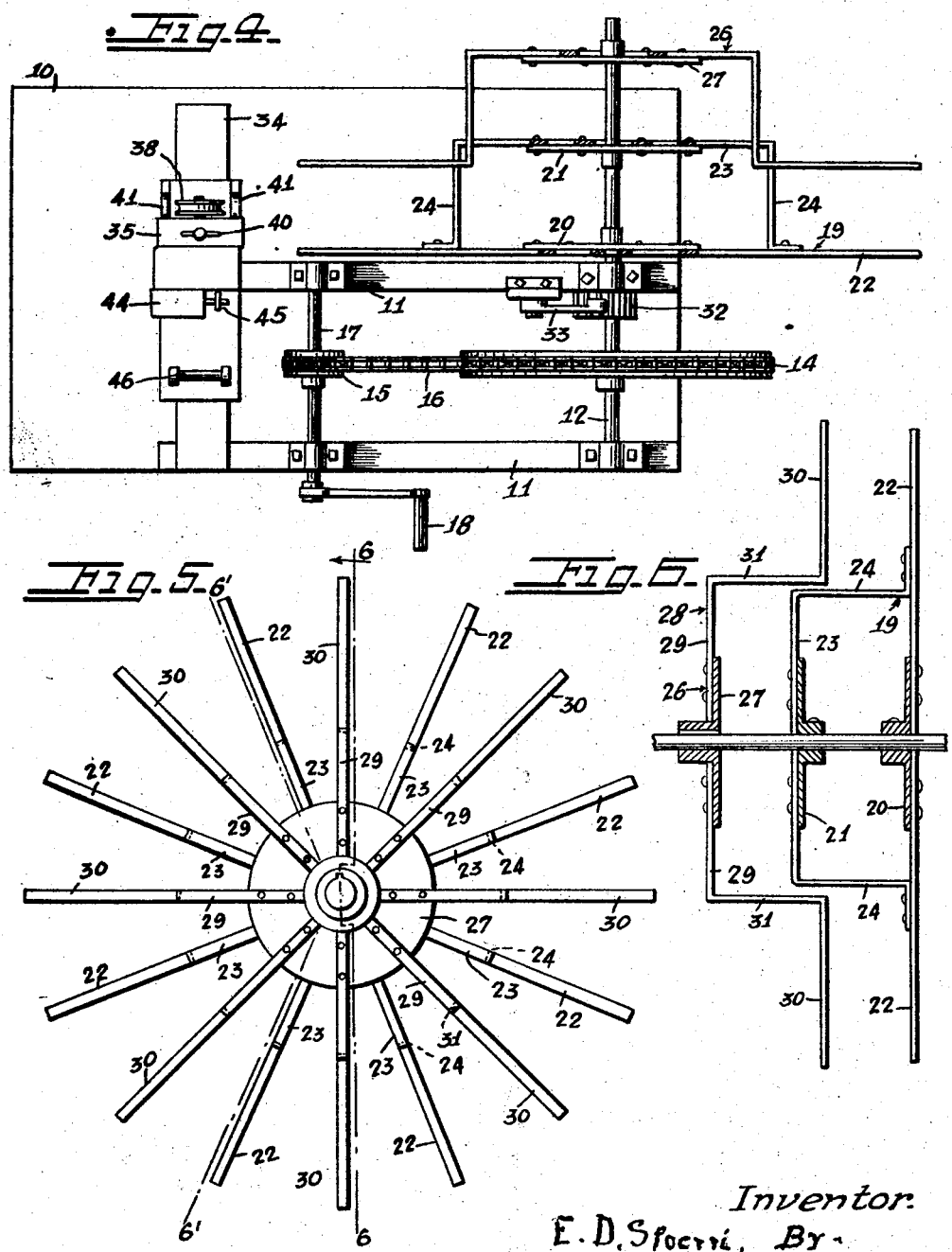

Patented Apr. 12, 1927.

1,624,633

UNITED STATES PATENT OFFICE.

EUGENE D. SPOERRI, OF OMAHA, NEBRASKA.

MEASURING AND REELING DEVICE.

Application filed July 1, 1926. Serial No. 119,858.

This invention relates to an apparatus adapted for use in measuring and reeling flexible strands, such as cables, ropes or similar articles when filling orders or making sales of the above named merchandise, and especially including heavy cables and ropes, the construction and arrangement being such that they may be moved upon the reel to form a package, and will be automatically measured while moving.

One of the objects of the invention is to provide means for use in connection with any suitable recording device, whereby cables, ropes or the like may be conveniently moved and reeled and lineal measurements conveniently ascertained.

Another object is to provide a portable device which may be conveniently moved from one part of a building to another where the above named articles may be stored ready for measurement and sale.

Another object in view is to provide an apparatus for the purposes described which will consist of few and simple parts so that it may be conveniently and economically manufactured.

The invention includes a separable reel to permit removal of the cable or other flexible strand after it has been reeled and measured, and includes a slidably mounted standard for supporting the movable cable and recording device and movable gripping mechanism for the movable cable, so that measurements will be correct.

With the foregoing objects in view and others to be mentioned, the invention presents a novel and useful construction, combination and arrangement of parts, as described herein and claimed, and as illustrated in the accompanying drawings, it being understood that changes in form, size, proportion of parts and minor details may be made, as found to be of advantage, said changes being determined by the scope of the invention as claimed.

In the drawings, Fig. 1 is a side view of the device, the spacing-frame being omitted. Fig. 2 is a view, partly in section, showing a side of a base-block with a standard mounted thereon. Fig. 3 shows the reverse side of the standard to the view thereof shown in Fig. 1. Fig. 4 is a plan view of the device, the upwardly projecting arms of the strand-holder and spacing-frame being in section. Fig. 5 is an end view of the spacing-frame and strand-holder. Fig. 6 is a sectional view taken on line 6—6 of Fig. 5, showing the parts between lines 6—6 and 6'—6'.

Referring now to the drawings for a more particular description, I provide a frame, preferably consisting of a platform 10 to which is secured a pair of upright, parallel side-sections 11, upon the rear part of said sections and transversely thereof being journalled a horizontal shaft 12. At 13 are indicated wheels for the platform to permit the device to be conveniently moved.

While the shaft 12 may be rotated by any suitable means, I prefer the use of a sprocket wheel 14 which is rigidly mounted on said shaft and adapted to be rotated by a small sprocket wheel 15, a sprocket chain 16 being provided for engaging said wheels, the sprocket wheel 15 being rigidly mounted on a stub shaft 17 adapted to be rotated by a crank 18.

I provide a strand-holder 19 consisting, in part, of a pair of discs 20 and 21, these being disposed adjacent to each other and rigidly mounted on the shaft 12 outwardly of the side sections. Numerals 22 indicate arms which extend radially from the shaft and are secured to the disc 20. The remaining part of the strand-holder consists of comparatively short, radially disposed arms 23 secured to the disc 21, each being bent at approximately a right-angle, midway between its ends, and providing a horizontal part 24 which is secured to an arm 22 of the adjacent disc 20, and it will be understood that the horizontal parts 24 operate as supports for a cable 25 when wound thereon.

Numeral 26 indicates a spacing-frame consisting, in part, of a disc 27 provided with angular arms 28 each having a radially disposed part 29 secured to said disc, and a radially disposed part 30, that part 31 of each arm 28 between its parts 29 and 30 being disposed horizontally and projecting toward the strand-holder.

The hub of the disc 27 is preferably splined on the shaft 12 so that it may rotate therewith and may be removed therefrom or may be adjusted longitudinally thereof, and the radially disposed end portions 30 of the arms 28 may be disposed between the horizontal parts 24 of the strand-holder.

As thus described, the crank 18 may be used for rotating the strand-holder and spacing-frame for reeling the cable upon the horizontal parts 24 of said holder, and the spacing-frame may be adjusted on the shaft 12 so that the radially disposed parts 22 and 30 will be disposed near to each other or further apart, depending upon the length of the cable or other strand to be measured; and thereafter the cable may be severed, and the spacing-frame may be removed from the shaft to permit removal of the measured and reeled cable or strand.

Numeral 32 indicates a ratchet wheel which is mounted on the shaft 12 and engaged by a pawl 33 to prevent any reverse rotation of said shaft, so that measurements may be correct.

Numeral 34 indicates a base-block which is disposed approximately parallel with the shaft 12 and is mounted on the side-sections at the front of the strand-holder. At 35 is indicated a standard for supporting certain parts for measuring the cable, said parts including a recording device, said standard being arranged to have sliding movements on the block since it is provided at its sides with projections $a$ adapted to engage beneath the ridges $b$ which are provided for said block.

A measuring-wheel 36 is provided and is disposed at one side of the standard, said wheel being provided with a spindle 37 which is journalled in the standard; and above the wheel 36 is disposed a peripherally grooved contact-wheel or pulley 38 preferably journalled on a wrist-pin $c$ which is provided for the standard.

The measuring-wheel is preferably provided with a milled periphery for suitable engagement with the cable 25 which, during operation, is moved upon the strand-holder by passing between these wheels. The wheel or pulley 38 is pressed downwardly toward the wheel 36 by means of a spring 39 so that the cable will be firmly engaged, a handscrew 40 being provided for adjusting the spring.

Numerals 41 indicate a pair of brackets or guides which are mounted on the standard near opposed parts of the measuring-wheel, for controlling the direction of movements of the cable.

Upon that side of the standard opposite to the measuring-wheel and mounted on the spindle 37 is a ratchet-wheel 42 engaged by a pawl $d$ to confine the rotatable movement of the spindle to a single direction, and mounted on the end of the spindle is a cam 43. Mounted on the upper part of the standard is a recording device 44 for indicating the length of the cable which has passed the measuring-wheel, said recording device being actuated by a link 45 which is connected with the cam.

In operation, the cable, rope or other flexible strand to be measured and reeled, is moved between and is firmly engaged by the peripheries of the measuring-wheel 36 and pulley 38. The end of the cable is then secured to the strand-holder 19. On account of the action of the spring 39 any obstruction or enlargement of the cable will not prevent it from moving, since the pin $c$ may move, subject to the resistance of the spring.

Since the cam 43 is eccentrically mounted on the spindle the link 45 will be reciprocated for actuating the recording device. While the parts may have any suitable proportions for co-operation with a recording device, the periphery of the measuring wheel 36, in the present instance is twelve inches,—that is to say, for each rotation of the spindle, the cable will move toward the reel a distance of one foot, and the recording device will be actuated accordingly for indicating the lineal measurement of the cable which passes said wheel.

The standard is provided with a handle 46 for use in sliding it transversely of the frame so that the cable may be wound uniformly upon the holder 19, the distance to which the standard is to be moved on the block 34 depending upon the length of the cable to be reeled; and an operator, while using the crank for reeling, may also adjust or move the standard on the base-block, rollers or balls 47 preferably being provided between these parts so that the sliding movements of the standard may be under convenient control.

I claim as my invention,—

1. In a measuring and reeling device for flexible strands, a frame, a horizontal, rotatable shaft journalled on the frame, a strand-holder rotatable with the shaft for moving a strand and including radially disposed arms each provided between its ends with a horizontal part for supporting the strand, a spacing-frame normally rotatable with the shaft and adapted to be adjusted longitudinally thereof and to be removed therefrom and having radially disposed arms adapted to project outwardly from between two adjacent horizontal parts of the strand-holder, a standard on the first named frame, a recording device on the standard, a spindle journalled in the standard, a measuring-wheel on the spindle arranged to be rotated by the moving strand, a cam on the spindle, and mechanism connected with the recording device and movable by the cam for actuating the recording device.

2. In a measuring and reeling device for flexible strands, a frame, a rotatable shaft journalled on the frame, a strand-holder rotatable with the shaft for moving a strand, a base-block disposed approximately parallel with the shaft and secured to the frame, a standard mounted slidingly on the base-block, a recording device on the standard, a spindle journalled in the standard, a measuring-wheel mounted on the spindle adapted to engage and to be rotated by the strand, a cam on the spindle, and a link movable with the cam for actuating the recording device.

3. In a measuring and reeling device for flexible strands, a frame, a rotatable shaft disposed transversely of and journalled on the frame, a strand-holder movable with the shaft for moving a strand, a base-block disposed transversely of the frame at the front of the strand-holder, a standard mounted on the base-block and adapted to be manually moved longitudinally thereof, a recording device mounted on the standard, a spindle journalled in the standard, a measuring-wheel on the spindle adapted to engage and be moved by the strand, a cam movable with the spindle, a link movable by the cam for actuating the recording device, an idler pulley journalled on the standard, and resilient means for pressing the idler pulley against said strand.

4. In a measuring and reeling device for flexible strands, a frame, a rotatable shaft journalled on the frame, a strand-holder movable with the shaft for moving a strand, a base-block stationary with the frame, a standard slidingly mounted on the base-block, a recording device on the standard, a spindle journalled in the standard, a measuring wheel secured to the spindle adapted to engage and to be rotated in one direction by the movement of the strand, mechanism connected with the recording device and movable with the spindle for actuating said recording device, means arranged for pressing the strand against the measuring wheel, and means on the standard for preventing a reverse rotation of the measuring wheel.

5. In a measuring and reeling device for flexible strands, a frame, a horizontally disposed rotatable shaft in bearings, a strand-holder rotatable with the shaft for moving a strand, said holder including radially disposed arms each provided between its ends with a horizontal part for supporting the strand, a standard on the frame, a recording device on the standard, a spindle in bearings, a measuring-wheel on the spindle arranged to be rotated by the strand, and mechanism connected with the recording device and movable by the spindle for actuating said recording device.

6. In a measuring and reeling device for flexible strands, a frame including a platform provided with wheels and a pair of side-sections, a revoluble shaft disposed transversely of the side-sections and journalled thereon, a strand-holder rotatable with the shaft for moving a strand, a base-block disposed transversely of and mounted on the side-sections, a standard slidingly mounted on the base-block, a recording device on the standard, a spindle journalled in the standard, a measuring-wheel secured to the spindle and arranged to be rotated by the strand, an idler wheel, a spring for pressing the idler wheel and strand against the measuring-wheel, mechanism connected with the recording device and movable by the spindle for actuating said recording device, and a pair of guides on the standard for controlling the direction of movements of the strand.

7. In a measuring and reeling device for flexible strands, a frame, a shaft rotatable in one direction, a strand-holder rotatable with the shaft for moving a strand, a standard, a recording device, a spindle in bearings, a cam mounted on the spindle, a measuring-wheel arranged to engage and to be rotated by the strand and to rotate the spindle in one direction, mechanism connected with the recording device and movable by the cam for actuating said recording device, means to prevent a rotation of the shaft in a reverse direction, and means to prevent a rotation of the spindle in a reverse direction.

In testimony whereof, I have affixed my signature.

EUGENE D. SPOERRI.